May 7, 1968     P. FORD ET AL     3,381,736

TIRE

Filed Feb. 23, 1966     2 Sheets-Sheet 1

Inventors:
Peter Ford
John Henry Hughes
by
Rauber and Lazar
attorneys

United States Patent Office 3,381,736
Patented May 7, 1968

3,381,736
TIRE
Peter Ford, Erdington, Birmingham, and John Henry Hughes, Dosthill, Tamworth, England, assignors to Dunlop Rubber Company Limited, London, England, a British company
Filed Feb. 23, 1966, Ser. No. 529,324
Claims priority, application Great Britain, Mar. 6, 1965, 9,599/65
9 Claims. (Cl. 152—362)

ABSTRACT OF THE DISCLOSURE

A pneumatic tire manufactured by a casting process which comprises pouring suitable material into a mould in which at least one bead wire is located by means of blocks mounted on the wire. The blocks are made of a material which has similar physical properties to the material of the bead region of the finished tire.

---

This invention relates to the production of pneumatic tires by a casting process.

In the manufacture of a pneumatic tire the elastic material from which the tire is made can be poured into the cavity of a mould of tires configuration, with the mould stationary or while it is rotating, to manufacture the tire by centrifugal casting.

In either case, it is necessary to provide beadwires embedded in the bead portions of the tire to retain the tire on the rim of the wheel when the tire is inflated and in use.

Difficulty is experienced in embedding the bead wires accurately in position since they tend to be displaced by the flow of material around them during the pouring or centrifugal casting operation.

It is advisable that any means which are utilised for locating the bead wires in position during manufacture shall not subsequently be the cause of weakness during operation of the finished tire and it is an object of the invention to provide a new or improved pneumatic tire and a method of manufacturing such a tire.

According to the invention there is provided a tire having a bead assembly comprising at least one turn of wire provided with a plurality of locating blocks for locating the bead assembly in the bead moulding region of a mould prior to casting the tire within the mould, the locating blocks being mounted on the wire and spaced apart thereof and the blocks being formed of a material having substantially the same physical characteristics as those of the material in contact therewith in the bead region, each block extending from the wire to at least two external surfaces of the tire in the bead region.

In one form of the above construction each locating block extends from the wire to, and forms part of, two external surfaces of the tire which meet to form the toe of the bead region of the tire, each block being disposed wholly axially inwardly of that region of the tire where two external surfaces of the tire meet to form the heel of the bead region of the tire.

All of the blocks in the bead assembly may be interconnected one with another to prevent relative movement between the blocks on the wire during the casting of the tire within the mould.

In one construction each block is slit for assembly on the wire, the material from which each block is formed being such that the slit is capable of being opened to allow passage of the wire there-through, each block embracing the wire in the assembled condition with its slit closed. Preferably the wire is encased within the same material as that from which the blocks are formed, the material encasing the wire being integral with adjacent blocks on the wire.

In all of the above constructions the material from which the locating blocks are formed comprises a polyurethane and a curing agent e.g., a polytetrahydrofurane and a tolylene diisocyanate, with a curing agent comprising methylene-bis-orthochloraniline.

Also in accordance with the invention there is provided a method of casting a tire within a mould comprising forming two bead assemblies each having at least one turn of wire provided with a plurality of locating blocks mounted on the wire and spaced apart thereof, locating two such bead assemblies, by means of their locating blocks, in the bead moulding regions of the mould and feeding into the mould curable casting material of such a composition that at least that part of the casting material which forms the bead regions of the tire has substantially the same physical characteristics as the material of the locating blocks.

In the above method each bead assembly is conveniently formed by moulding a plurality of locating blocks in spaced-apart relationship around at least one turn of wire, the wire being located in a mould having a plurality of block-moulding cavities spaced apart around the wire, material for moulding the blocks being introduced into the mould to fill said cavities and also to encase the wire to interconnect adjacent blocks.

Preferably the mould within which the tire is cast is rotated, after the bead assemblies have been located therein, for centrifugally-casting the tire.

The invention also includes a method of moulding a bead assembly for use in the manufacture of a tire as hereinbefore described and also includes a bead assembly and a tire constructed by any of the methods described above.

One embodiment of the invention will now be described by way of example with reference to the accompanying drawings wherein.

Figure 1:
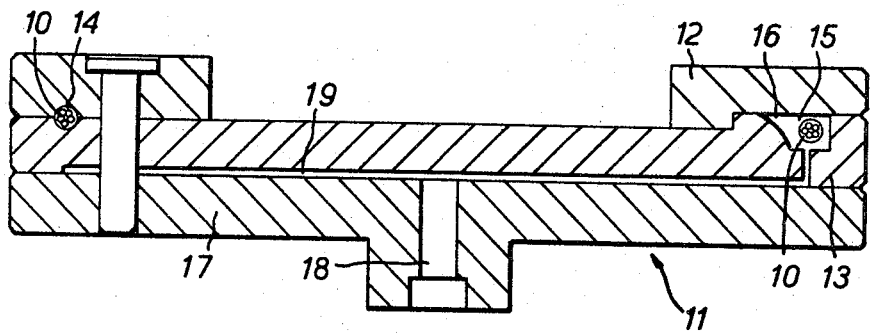
FIGURE 1 is a transverse cross-sectional view of a three part mould utilised for the moulding of bead wire locating blocks upon a bead wire.

A bead wire assembly for use in a tubeless tire manufactured by the centrifugal casting of liquid polyurethane in a tire mould is manufactured in the following manner:

Referring to FIGURE 1, an annular bead wire 10, comprising five turns of steel wire, is located in a three-part injection mould 11. Between a top cap part 12 of the mould, and an intermediate mould part 13, an annular groove 14 is formed, the groove being formed partly in the top cap 12, and partly in the intermediate mould part 13. The groove 14, at equally-spaced intervals at eight positions, runs into block-moulding cavities 15.

The block-moulding cavities 15 are shaped so that a tongue-forming recess 16 projects from one part of the cavity, the tongue-forming recess having a profile complementary to the profile of the toe of the bead portion of the tubeless tire in which the bead wire assembly is eventually incorporated. The wire 10 forms a loose fit in the groove 14 to allow the flow of material around the wire from one block-moulding cavity 15 towards an adjacent cavity, as will be appreciated from the description which follows:

A third mould part 17 fits against the face of the intermediate mould part 13 remote from the top cap part 12 of the mould, the third part 17 being provided with an injection port 18 leading to galleries in the form of grooves 19 extending to each of the cavities 15 so that liquid polyurethane can be fed through the port 18 into the galleries and into the cavities 15 to form tongued blocks around the wire 10 extending through them, the liquid polyurethane then flowing from the cavity along and around the bead wire resting in the grooves 14 to surround it, the bead wire 10 eventually being completely embedded in polyurethane.

Figure 2:
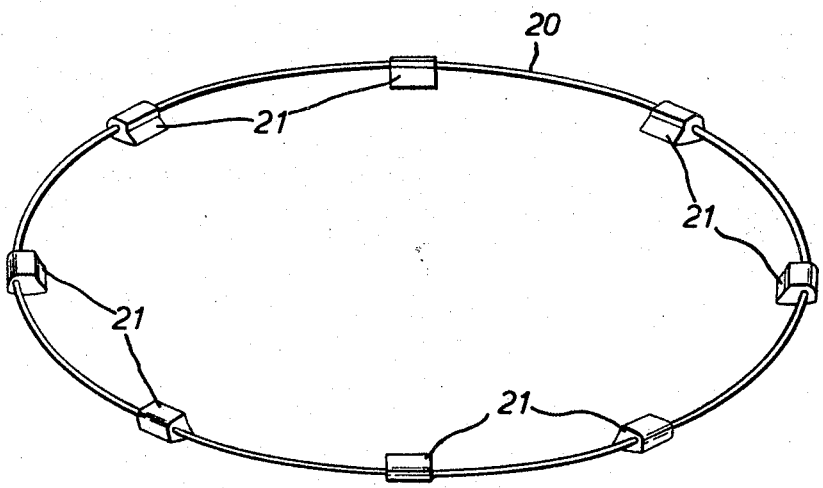
FIGURE 2 is a perspective view of the moulded locating blocks on the bead wire, the bead wire itself also being encased in moulded material.

The liquid polyurethane comprises 100 parts by weight of adiprene L–100 (an isocyanate-tipped prepolymer based on polytetrahydrofurane and tolylene diisocyanate having an isocyanate-group content of 4.2% and obtainable from Du Pont) and 11 parts by weight of methylene-bis-orthochloraniline, and is injected into the mould 11 at a pressure of 25 lbs. per square inch, the filled mould being heated to a temperature of 100° C., for one hour before the mould is opened, and the coated bead wire 20, provided with moulded tongue blocks 21 (see FIGURE 2) is removed from the mould, moulding "flash" and sprues being buffed from the polyurethane coating.

Figure 3:
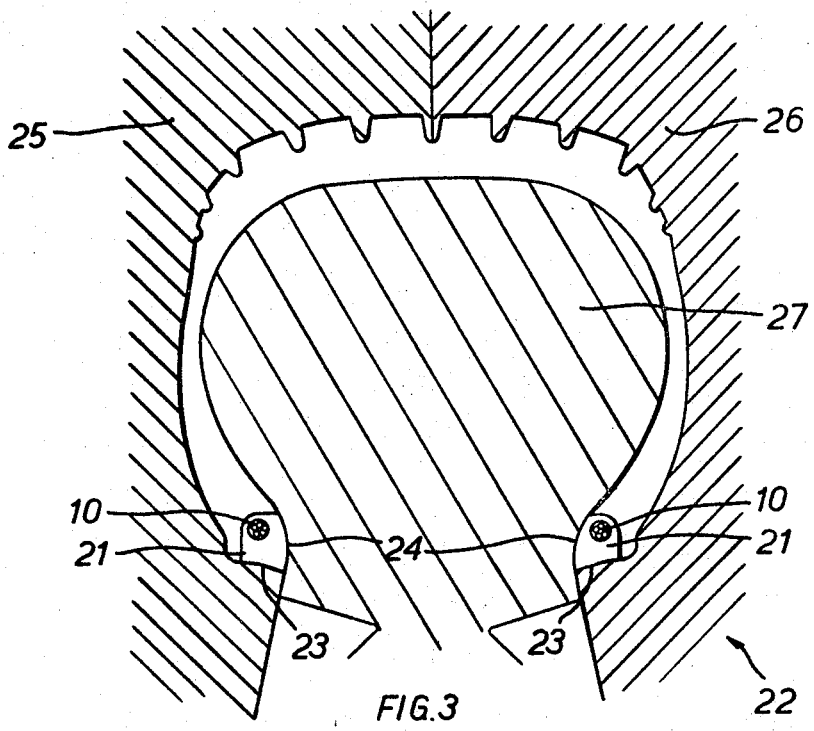
FIGURE 3 is a cross-sectional view of a mould for the centrifugal liquid casting of a tire, the bead wires and moulded locating blocks being shown in position in the mould.

A second coated bead wire 20 is prepared with blocks 21 in the manner described for the first bear wire, and the two prepared bead wires are located one in each of the bead regions of a tire mould 22 (see FIGURE 3), the tongues moulded on the blocks 21 resting on two moulding faces 23 and 24 provided on the mould which join together to define the toe portion of the bead of a tubeless pneumatic tire.

It will be appreciated that the tire mould is made in two parts 25 and 26, each for moulding a part of the tread, a sidewall and a bead heel, base, and part of a toe the two parts 25 and 26 each having a moulding surface 23 in the bead base region for moulding part of a toe, and a core 27 which is provided to mould the interior of the tire including the surface 24 in each bead region which forms the remaining part of a bead toe.

It will also be appreciated that the bead wire 10 is located by the tongues of the blocks 21 accurately in position within the mould in the bead region, and by virtue of this location will not be displaced by polyurethane poured into the mould to form the tire either prior to, or whilst the mould is being rotated to cast the tire centrifugally. This polyurethane is of the same composition as that used for moulding the blocks and when the mould is completely full, and overflows from an outlet provided the inlet and outlet are sealed and the cast tire cured for three hours at a temperature of 100° C., the bead wire and blocks being bonded in position.

Figure 4:
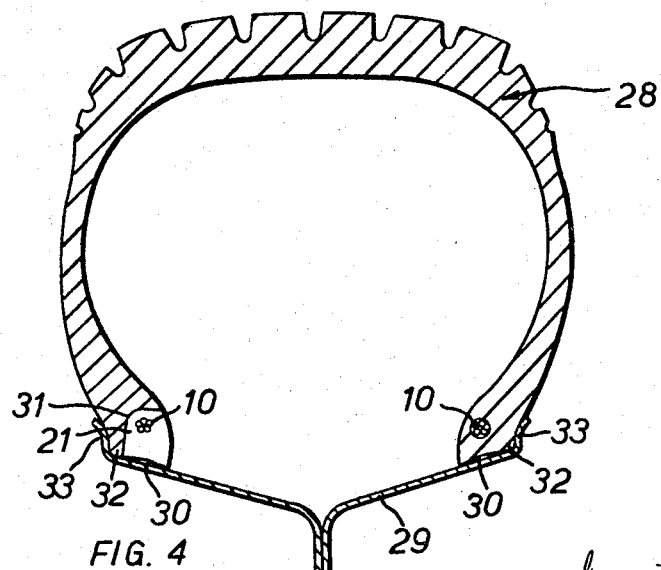
FIGURE 4 is a sectional view of a cast tire incorporating bead wires and locating blocks, the tire being shown mounted upon a wheel rim.

A cast tire 28 is shown in FIGURE 4 of the drawings with its bead region mounted upon a flanged wheel rim 29. By virtue of the fact that the blocks 21 do not extend across the whole of the bead base 30, there are no continuous leakage paths directly to the outside of the tire, between the surfaces 31 of the polyurethane blocks, where they adjoin the cast polyurethane, should there be an imperfect bond, any leakage path which might occur terminating at the bead base 30 axially inwardly of the bead heel 32. It will be appreciated that the bead base 30 fits air-tightly upon the base of the wheel rim 29, when the tire is assembled on a wheel and inflated and an air-tight seal is formed between the bead heel 32 and the flange 33 of the wheel rim.

It may be necessary to paint the surface of the polyurethane within which the bead wire 10 is embedded, before locating the coated bead wire 20 in the mould 22, with a mixture of "Desmodur R" (a solution of triphenylmethane triisocyanate in methylenechloride, obtainable from Farbenfabriken Bayer A. G.) and "Desmocoll 176" (an isocyanate-modified polyester also obtainable from Farbenfabriken Bayer A.G.) to ensure a perfect bond.

In an alternative construction of bead assembly (not illustrated) a plurality of moulded locating blocks are again provided in spaced-apart relationship around the bead wire. However, in this construction each block is slit and is formed of such a material, or the material is in such a state that, the slit can be opened to assemble the block on the wire and, after assembly of the wire, the block embraces the wire with the slit closed. The blocks are of the same configuration as hereinbefore described and there may be provided moulded spacing collars mounted around the wire between adjacent blocks to prevent relative movement between them when the tire is being cast. Such collars may be either integral with or separate from adjacent blocks and are formed of the same material as the blocks, this material, as hereinbefore described, having substantially the same physical characteristics as those of the tire material in contact therewith in the bead region.

Bead assemblies according to the present invention are particularly useful in the manufacture and in the construction of tires as described in the specification of the co-pending U.S. patent application Ser. No. 529,000, filed Feb. 21, 1966 and assigned to the same assignee. While the material of the tire according to the invention described in this co-pending application is different in one part of the tire compared with another, the material in the bead region of the tire surrounding the bead wire is substantially the same as that from which the blocks are made.

Having now described our invention, what we claim is:

1. A tire having a bead assembly comprising at least one turn of wire a plurality of locating blocks mounted on the wire and spaced apart thereof for locating the bead assembly in the bead moulding region of a mould prior to casting the tire within the mould, at least two external surfaces on the tire in the bead region thereof to which each block extends and the blocks being formed of a material having substantially the same physical characteristics of those of the tire material in contact therewith in the bead region of the tire.

2. A tire as claimed in claim 1 including two external surfaces which meet to form the toe of the bead region of the tire and each locating block extending from the wire to and forming part of said two surfaces.

3. A tire as claimed in claim 2 including two external surfaces of the tire which meet to form the heel of the bead region of the tire and each block being disposed wholly axially inwardly of that region of the tire where said two surfaces meet.

4. A tire as claimed in claim 1 wherein all of the blocks in the bead assembly are interconnected one with another to prevent relative movement between the blocks on the wire during the casting of the tire within the mould.

5. A tire as claimed in claim 1 wherein each block is slit for assembly on the wire, the material from which each block is formed being such that the slit is capable of being opened to allow passage of the wire therethrough each block embracing the wire in the assembled condition with its slit closed.

6. A tire as claimed in claim 1 wherein the wire is encased within the same material as that from which the blocks are formed, the material encasing the wire being integral with adjacent blocks on the wire.

7. A tire as claimed in claim 1 wherein the material from which the locating blocks are formed comprises a polyurethane and a curing agent.

8. A tire as claimed in claim 7 wherein the polyurethane is based upon a polytetrahydrofurane and tolylene diisocyanate.

9. A tire as claimed in claim 7 wherein the curing agent comprises methylene-bis-orthochloraniline.

References Cited

UNITED STATES PATENTS

| | | | |
|---|---|---|---|
| 1,592,671 | 7/1926 | Nichols | 264—275 |
| 2,376,085 | 5/1945 | Radford et al. | 264—275 |

ARTHUR L. LA POINT, *Primary Examiner.*

Y. P. SCHAEVITZ, C. B. LYONS, *Assistant Examiners.*